May 29, 1956   M. GOLDBERG ET AL   2,747,530
MACHINE HAVING A PLURALITY OF HOOKED FEEDING NEEDLES
AND MEANS FOR FORMING INTERLINKED HAIRS ON A
PLASTIC HEAD OF A DOLL AND THE LIKE
Filed May 11, 1954                                 6 Sheets-Sheet 1

MAX GOLDBERG
ROBERT J. GARWIN
INVENTORS

BY Joseph Blacker
ATTORNEY

MAX GOLDBERG
ROBERT J. GARWIN
INVENTORS

BY Joseph Blacker
ATTORNEY

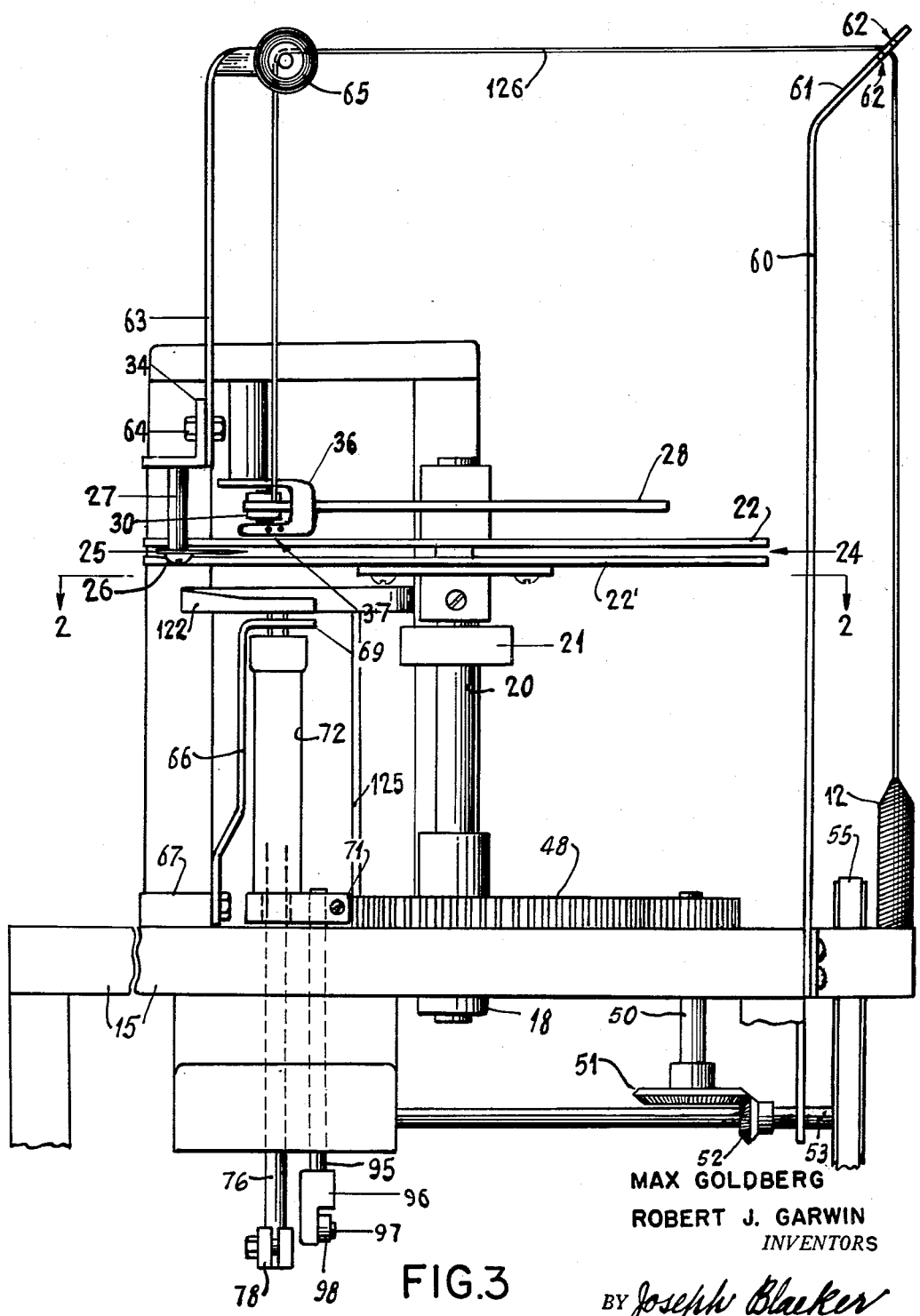

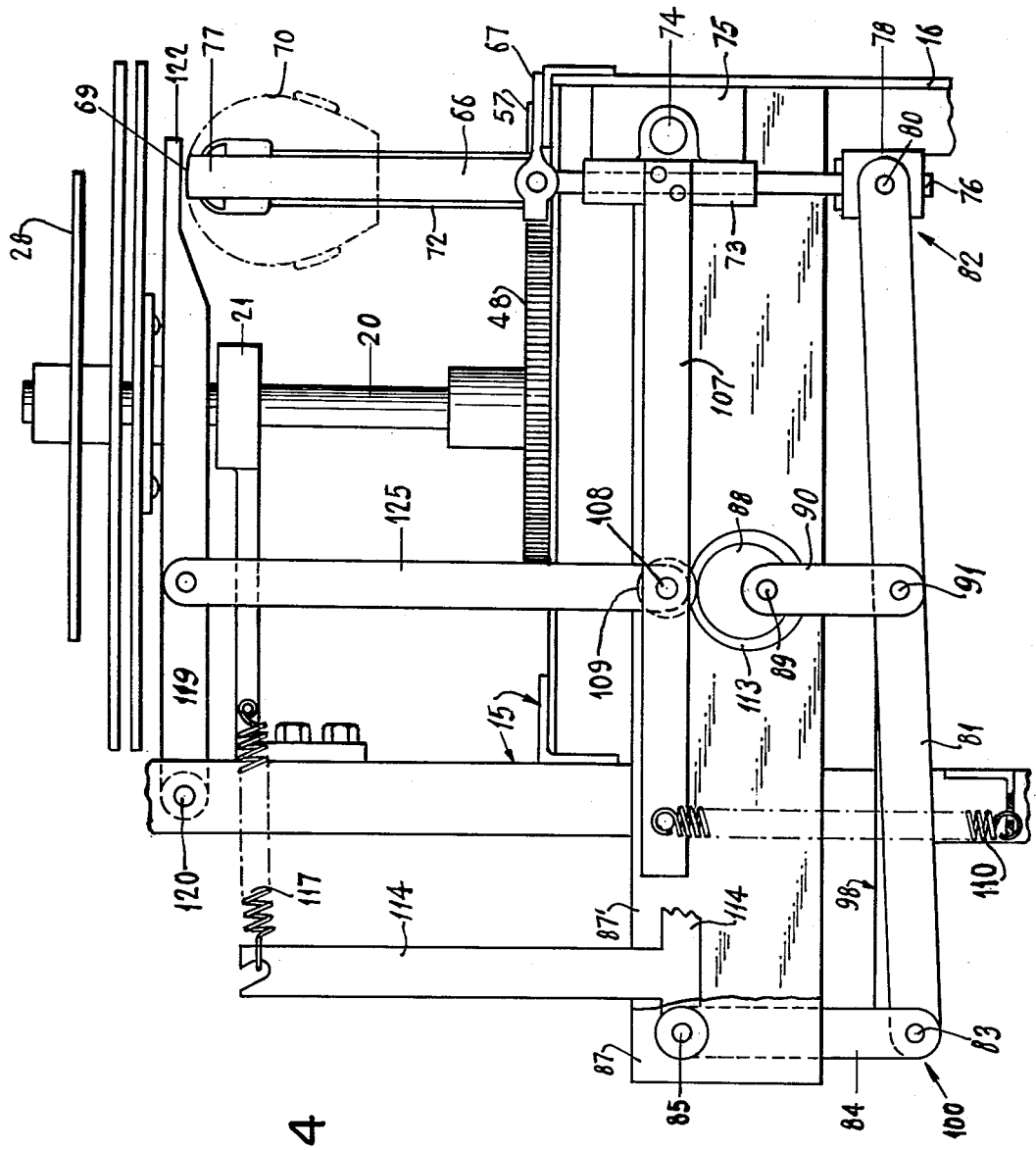

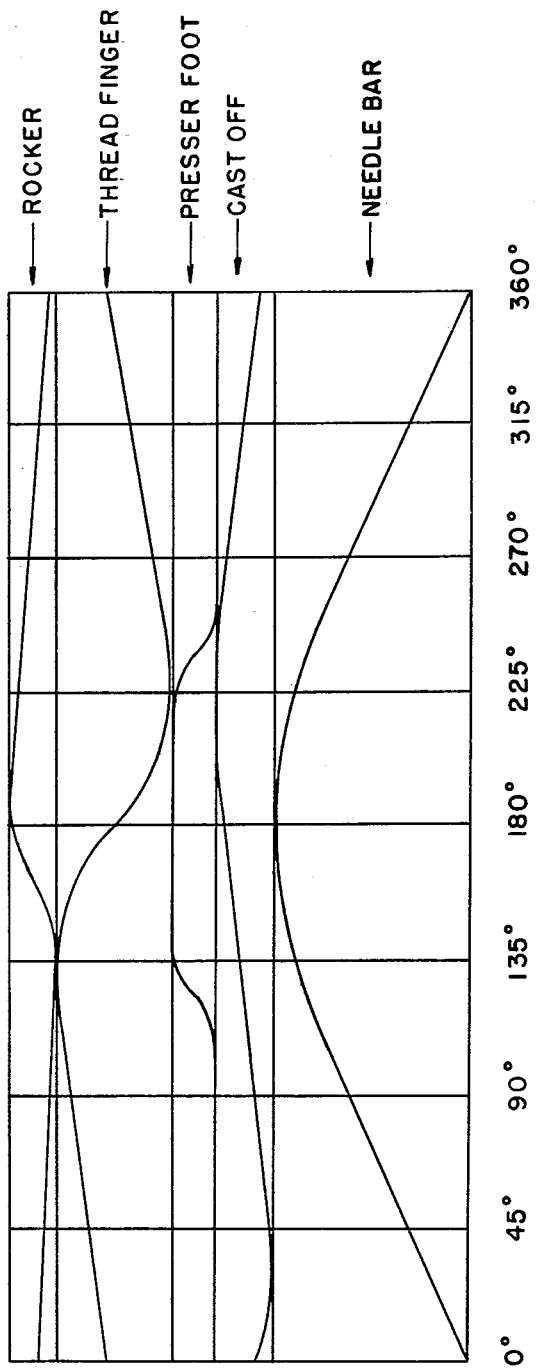
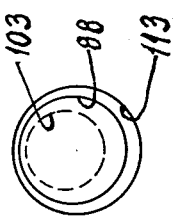
FIG. 6
FIG. 5
MAX GOLDBERG
ROBERT J. GARWIN
INVENTORS
BY Joseph Blacker
ATTORNEY

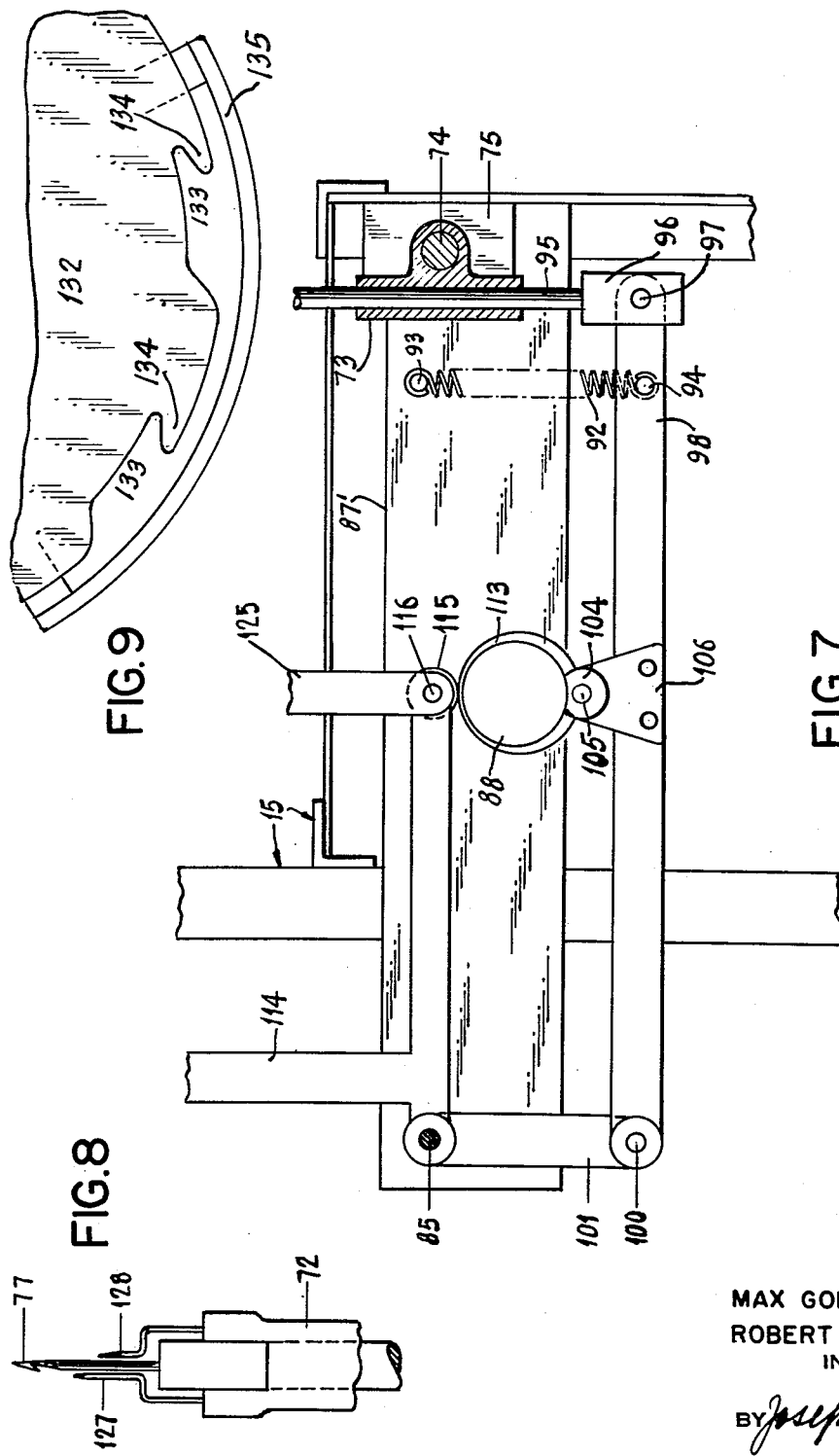

United States Patent Office 2,747,530
Patented May 29, 1956

2,747,530

MACHINE HAVING A PLURALITY OF HOOKED FEEDING NEEDLES AND MEANS FOR FORMING INTERLINKED HAIRS ON A PLASTIC HEAD OF A DOLL AND THE LIKE

Max Goldberg and Robert J. Garwin, New York, N. Y.

Application May 11, 1954, Serial No. 428,944

10 Claims. (Cl. 112—79.5)

This invention relates to a high speed multiple needle interlinked stitching machine preferably used for securing hairs to a plastic head of a doll, and the like, to produce a doll's head covered with hair formed from thread supply filaments known as "saran."

An object of this invention is to provide a frame-like platform having built thereinto high speed mechanism forming interlinked stitching and means for cutting same to desired pre-determined uniform hair length.

Another object of this invention is to provide a high speed multi-needle interlinked stitching machine for forming hairs on a plastic doll's head, to provide interchangeable gear ratios for varying the peripheral speed of apertured hair length measuring disks, and having a fixed cutting blade between the measuring disks for cutting the hairs formed on the doll's head to desired length.

Another object of this invention is to provide high speed cam actuated linkage below the platform and arranged to actuate hooked needles and the castoffs and the presser foot and the length measuring and cutting devices in timed relation.

A major object of this invention is to provide a modified measuring mechanism which employs disks having through radial openings and hook-shaped end portions, each of which terminates in a blunt hook end.

This modified measuring mechanism obviates the danger, in that many an operator had a finger caught in a measuring aperture while the machine was operating and on coming in contact with the cutting blade, an end portion of the finger was cut off. The open sided opening gives a chance to extricate the finger.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 3 is a front elevation of the sewing machine shown in Figures 1 and 2.

Figure 4 is a side elevation of the sewing machine.

Figure 5 is a diagrammatic elevational view showing the relative positions of three eccentrics for the moving parts.

Figure 6 is a diagrammatic view showing the relative distance movements of needle bar, castoff, presser-foot and thread finger.

Figure 7 is a cross-sectional view taken on line 7—7 in Figure 2.

Figure 8 is a side view of a fragmentary portion of the castoff carrier assembly on an enlarged scale.

Figure 9 is a plan view on an enlarged scale of a fragmentary portion of modified safety measuring disks.

Figure 1:
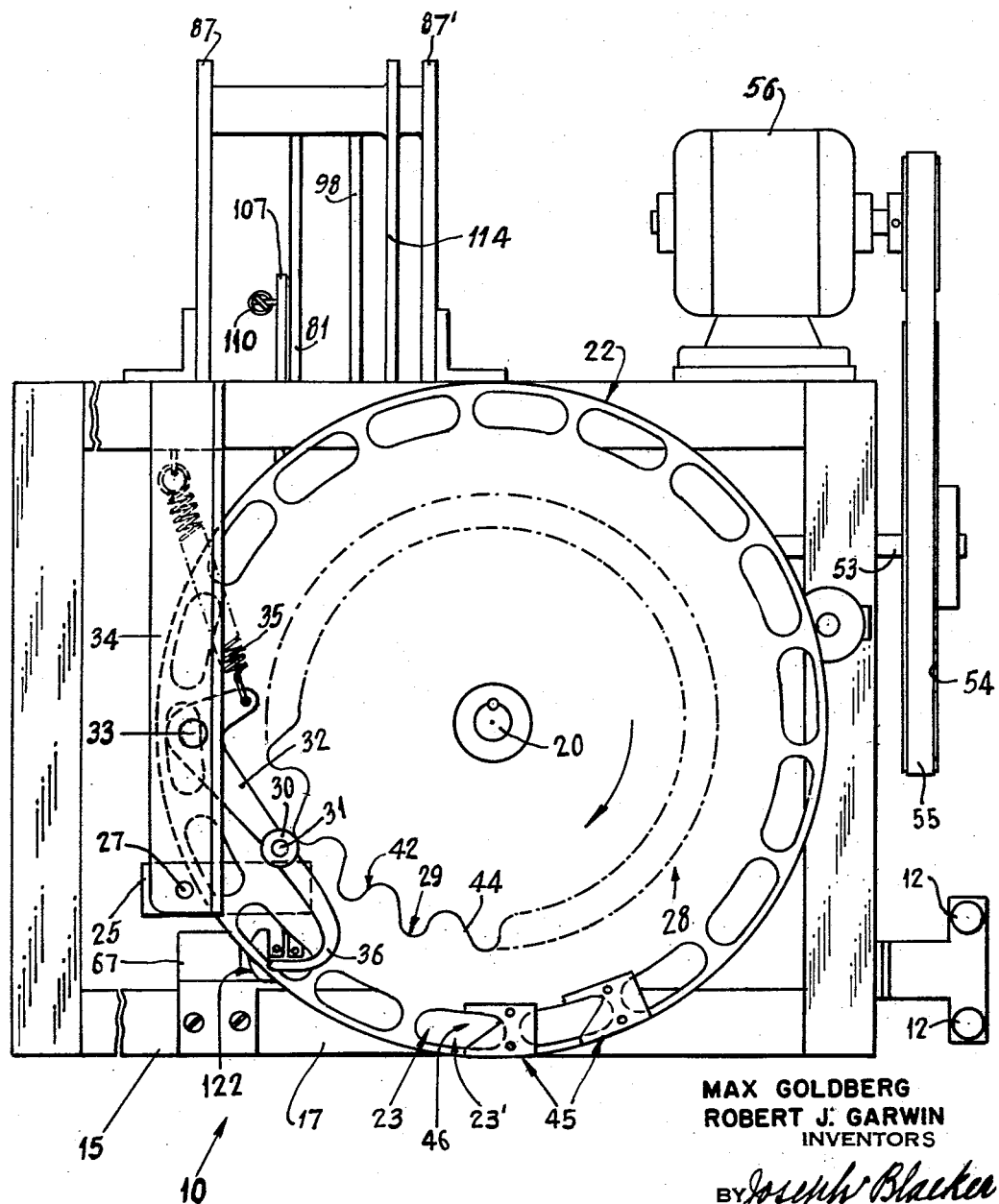
Figure 1 is a top plan view of a multiple needle sewing machine embodying our invention.

In the illustrated embodiment of the invention, the numeral 10 indicates a multiple needle interlinked stitching machine designed for stitching hairs to plastic heads of dolls, etc. The hairs, known as "saran," are fed from supply spools 12.

The machine 10 comprises a hollow rectangular frame 15 supported on legs 16 and having a box-like platform 17 lying in a horizontal plane. Rotatably mounted in a bearing 18 fixed to a transverse beam 19 is a vertical shaft 20.

The shaft 20 is rotatably mounted at its upper end in a bearing 21 which is suitably fastened to an upright member of the frame 15.

Secured to the upper portion of the shaft 20 by a screw is a lower measuring disk 22', having a series of arcuate apertures 23', which are positioned close to the outer periphery of the disk. Also secured to the shaft 20 is an upper measuring disk 22 having a series of arcuate apertures 23 which are in alignment and in superposed relation with the apertures 23'. The disks 22 and 22' are in slightly spaced-apart relation to provide an opening 24 for a horizontally positioned cutting blade 25 which is secured between the disks by being held by a screw 26 at the lower face of a vertical rod 27. The rod 27 is suitably fixed to an angular upper portion of the frame 15.

Secured to the shaft 20 in spaced-apart relation above the upper apertured disk 22 is a cam disk 28 having the same number of peripheral cam surfaces 29 as the number of apertures in the disks 22 and 22'.

A cam follower roller 30 is rotatably mounted on a pin 31 in a lever 32 which is pivotally mounted on a bolt 33 threaded in an angle member 34. At its rear eand, the lever 32 is connected to and is actuated by a spring 35 to bring its front end in direction of the cam disk 28 and with the follower roller in contacting relation with one of the cam surfaces. At the front end of the lever 32 is a thread finger 36 having a plurality of apertures 37 equal to the number of thread filament supply spools 12.

As best shown in Figure 1, each cam surface has one side 42 angularly directed with a sharp slope and the other side 44 angularly directed with a gradual slope. The gradual slope first actuates the follower roller and the thread finger gradually outwardly and the slope 42 actuates the finger quickly inwardly.

Each cam surface in succession, actuates the spring-tensioned follower roller 30 and moves the lever and thread finger towards and from the needles. When the thread filaments are engaged by the needles, one of the cam surfaces permits the follower roller to move quickly toward the shaft 20 and this causes the thread finger 36 to move to inoperative position away from the needles.

At each aperture 23 at the upper face of the upper disk 22, there is attached a substantially rectangular guide plate 45 having an angular opening 46. The apex of the opening is positioned inwardly of the aperture 23 and causes the thread filaments to be directed to the inner surface of the aperture 23 and in position for the needles to grip the thread filaments.

The mechanism of this invention cuts the thread filaments so as to form upstanding hairs of pre-determined identical lengths in the crown portion of the head of a plastic doll. For this purpose, the cutting blade 25 which extends between the upper and lower apertured disks 22 and 22' cuts the thread filaments to the desired length above the doll's head.

Figure 2:
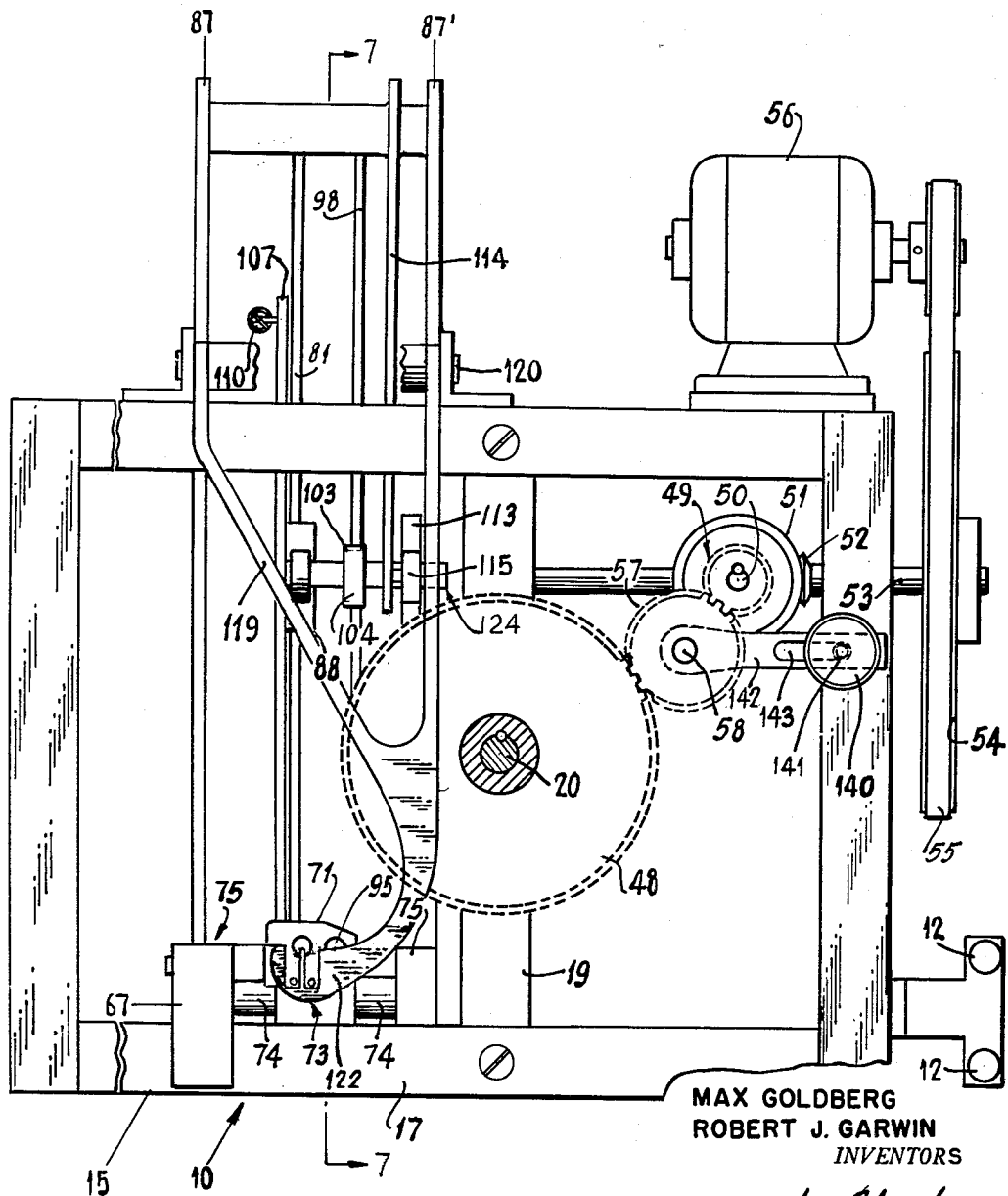
Figure 2 is a cross-sectional view taken on line 2—2 in Figure 3.

As shown in Figure 2, the shaft 20 has a gear 48 of large diameter fixed thereto. A drive gear 49 is mounted on a vertical shaft 50 which carries a bevel gear 51 at its lower end. A bevel gear 52 carried by a horizontal shaft 53 is in meshed relation with the bevel gear 51.

The shaft 53 carries a pulley 54 driven by a belt 55 connected to a pulley on an electric motor 56. An idler gear 57 is mounted on a vertical shaft 58 between the gears 48 and 49 and transmits motion from the small drive gear 49 at a reduced speed to the large gear 48.

As shown in Figures 3 and 4, there is provided a filament support 60 having a transverse extension 61 with a plurality of open ended slotted apertures 62. A filament tensioning support 63 is secured at its lower end to the angle member 34 by a bolt 64. The support 63 has a plurality of spring-pressed washers 65. The thread filaments pass from the spools 12 through the slotted apertures 62 and between the washers 65 in tensioned relation to the apertures 37 in the thread finger 36 to the hooked needles.

As shown in Figure 4, there is provided a substantially upright arm 66 suitably held by a bracket 67 which is fixed to the frame 15. At its upper end, the arm 66 is bent to provide a work support 69 which is of small area to permit the plastic head 70 to a doll to be moved thereover by the needles 77 in step-by-step relation. The support 69 provides bearing surfaces for successive sectional portions of the crown of the doll's head as is required when securing hairs to the crown.

Supported inwardly of the frame 15 by a clamp 71 is a tubular housing 72. A trunnion 73 is supported on a pivot pin 74 mounted in side blocks 75 to permit to-and-fro oscillatory motions of the trunnion. A needle bar 76 is slidably mounted for up and down motions in the trunnion 73 and in the tubular housing 72. A plurality of hooked needles 77 are suitably held at the upper end portion of the needle bar 76. The lower end of the needle bar 76 has a transverse bracket 78 secured thereto. The bracket 78 has a pin 80 extending therefrom. The tubular housing 72 functions as a castoff carrier.

An elongated horizontal link 81 has its front end 82 secured to the pin 80. The rear end of the link 81 is connected by a pin 83 to an upright link 84. The upper end of the link 84 is pivotally mounted on a fixed horizontal journal 85 passing through plates 87, 87' which are suitably fixed to the frame 15.

The horizontal drive shaft 53 carries an eccentric 88 at one end. A pin 89 extends from the eccentric 88. A crank 90 connects the pin 89 to a pin 91 secured at about the mid-portion of the elongated link 81. Rotation of the drive shaft 53 causes rotation of the eccentric 88 and up and down movements of the link 81 and this causes up and down movements of the needle bar 76.

A cast-off actuating bar 95 is slidably mounted for up-and-down motion in the trunnion 73 and in parallel side-by-side relation with the needle bar 76. The lower end of the bar 95 carries a transverse bracket 96 having a pin 97 extending therefrom. A further elongated horizontal link 98 has its front end secured to the pin 97. The rear end of the link 98 is connected by a pin 100 to an upright link 101. The upper end of the upright link 101 is also pivotally mounted on the fixed horizontal journal 85. The horizontal drive shaft 53 also carries a further eccentric 103 in spaced-apart relation from the eccentric 88. The eccentric 103 is in contacting relation with a roller 104 which is rotatably mounted on a pin 105 carried by an upright arm 106 fixed at substantially the mid-portion of the horizontal link 98. The eccentrics 88 and 103 are mounted on the drive shaft 53 in timed relation so that the needle bar 76 reciprocates a greater distance than the further bar 95. A spring 92 is fixed at its upper end to a pin 93 in the plate 87' is fixed at its lower end to a pin 94 in the link 98. The spring 92 serves to maintain the roller 104 resiliently in contact with the eccentric 103.

An elongated arm 107 is fixed to the front end portion of the trunnion 73 and above the eccentric 88. At its mid-portion, the arm 107 has a pin 108 on which a roller 109 is rotatably mounted in contacting relation with the first eccentric 88. A spring 110 is fixed at its upper end to the free end of the elongated arm 107 and is fixed at its lower end to an angle 111 in the frame 15. Rotation of the drive shaft 53 causes up and down swinging motions of the arm 107 about the pivot pin 74 and this causes perceptible substantially horizontal to-and-fro movements of the trunnion and of the upper end of the needle bar 76.

The drive shaft 53 carries a further eccentric 113 in spaced-apart relation with the first mentioned eccentrics 88 and 103. A bell crank lever 114 is pivotally mounted on the journal 85 and extends above the eccentric 113. The lever 114 carries a roller 115 on a pin 116. The roller 115 is in contacting relation with the eccentric 113. At its upper end, the lever 114 is connected by a spring 117 to a forward and upper portion of the frame 15.

A presser-foot carrier 119 is pivotally mounted on a horizontal pin 120 at its rear end and carries a presser-foot 122 at its front end. The presser-foot 122 is in superimposed relation with the work support 69. The carrier 119 has a transverse pin 124. An upright link 125 is connected at its lower end to the pin 116 that carries the roller 115 and at its upper end to the pin 124 in the carrier 119.

Rotation of the drive-shaft 53 causes the presser-foot 122 to move up and down to and from the work support 69. The presser-foot 122 when raised, releases the material worked upon to permit the needles 77 to feed the material worked upon with ease.

It is to be noted that due to the trunnion mounting on the pivot pin 74 that the trunnion serves as the means for imparting to-and-fro motions of both rods 76 and 95 and of the castoff carrier 72 and of the needles and of the castoff pins.

It will be noted that the castoff carrier 72 has a castoff pin 127 in front of each needle 77. A support pin 128 is also provided at the rear of each needle to prevent the needle from bending during its feeding action of the material worked upon.

Each castoff pin retains the previously formed thread loop to permit the needle to pass through the thread loop. Each front castoff pin has a sharp upper point, which is moved up and against the material worked upon and covers the open hook of the needle during the period when the needle is travelling downwardly.

In the measuring and cutting operation, the upper point of support for the thread element is the thread finger 36. The lower point of support for the thread element is the needle 77. The result is that between the upper and lower points of support there is a vertical piece of the thread element which passes through one of the apertures in the measuring disk 22.

The disk is then given a partial rotation which causes this bridged portion of the thread element to be pulled rearwards, in looped form, toward the cutting blade which cuts the loop. One-half of the loop remains attached to the plastic head of the doll and assumes the function of a hair cut to proper length and extending from the head.

The operator, in order to start the operation, places the thread filaments 126 from the supply spools 12 in supported relation on two elevated thread filament supports 60 and 63. The operator then passes the thread filaments through the apertures 37 in the thread finger 36 and then down through an aperture 23 in the upper measuring disk 22 and through an aperture 23' in the lower measuring disk 22'. Then the thread filaments are caused to pass into the adjacent advanced apertures 23 and 23' in the measuring disks 22 and 22' and the operation is repeated. The thread filaments are then caused to assume a position in alignment with the needles. The needles then rise at one side of the tensioned filaments and when the hooks of the needles are above the horizontal portion of the thread filaments, the thread finger 36 is swung by a cam surface to the right. This brings the thread filaments in line with the hooks of the needles. Then the needles start downwardly and the needle hooks engage and carry the thread filaments through the crown portion of the plastic head of a doll 70 mounted upon the head support 69.

The apertured measuring disks 22 and 22' then pull the thread filaments to the left and into contact with the cutting blade 25 and this results in cut-to-size hairs on the doll's head. It is to be noted that the length of the hairs is dependent upon the respective lengths of the apertures in the measuring disks 22, 22'.

Figure 9 shows a fragmentary portion of modified safety measuring disks 132 having concentrically positioned openings 133 disposed in spaced-apart relation at the outer periphery of the disks and open radially outwardly. Each opening is formed to provide a blunt shaped hook 134 at one end for engaging the thread but avoiding a closed pocket where the operator's finger may be caught by a solid enclosure defining each aperture and cut by the blade 25, as shown in Figure 1.

In coaction with the hook shaped opening 133, we provide a stationary arcuate guard 135 which partly circumscribes the cutting portion or danger portion of the disks 132 and prevents finger cutting accidents. It is to be noted that the longer each aperture is made, the longer is the hair formed on the doll's head.

It is also to be noted that the rate of the number of stitches for a given time remain constant and that the number of apertures per given time must equal the number of up-and-down motions of the needles, regardless of the length of the aperture. In other words, the longer the aperture, the faster must the measuring disks rotate in order that the needle strokes and aperture presentations to the needle remain the same. This will necessitate that the measuring disks revolve proportionately faster as the apertures increase in length and this arrangement incidently measures the length of hair that will be cut off from the thread filaments.

It is to be noted that the change gear set shown in Figure 2 as identified by the numerals 48, 57 and 49 are interchangeable with other change gear sets so as to make it possible to vary the speed of the measuring disks 22, 22'.

In connection with the gear set shown in Figure 2, it is to be noted that it is possible to change a gear set by changing the size of the gear 49 and adjusting the idler gear 57 by means of a knob 140 which is threadably mounted on a bolt 141.

An arm 142 has a slot 143 in engagement with the bolt 141 and has its free end in engagement with the shaft 58. By unscrewing the knob 140, it is possible to swing the idler gear 57 into engagement with the gear 48 and with a drive gear 49 of suitable diameter. The gear set may be thus changed by varying the diameter of the gear 49.

In accordance with the patent statutes we have described and illustrated the preferred embodiment of our invention, but it will be understood that various changes and modifications can be made therein without departing from the spirit of the invention as defined by the appended claims.

We claim:

1. In combination with a machine having a plurality of hooked needles and means whereby the needles feed the material worked upon to form interlinked looped hairs, a substantially upright elongated arm mounted adjacent said needles and having a work support at its upper end for supporting a plastic doll's head, said work support having through slots through which said needles move up and down, means for supporting thread filament spools, means for feeding said thread filaments in tensioned relation to said needles, a presser-foot mounted above said work support, a drive shaft carrying eccentrics, and means for actuating said needles and said presser-foot in timed relation from said eccentrics, means for moving said presser-foot to said work support in spaced-apart relation therefrom to permit said needles to feed said doll's head with ease for each movement of the needles and means for measuring and cutting the thread filaments secured to said doll's head to form hairs of uniform predetermined length on the head of said doll.

2. In combination with a machine having a plurality of hooked needles and means whereby the needles feed the material worked upon to form interlinked hairs, a horizontally supported frame, a substantially upright elongated arm mounted on said frame adjacent said needles and having a work support at its upper end for supporting an article to be covered with hairs, said work support having open end slots through which said needles move up and down and forward and backward, means for supporting thread filament spools, means for feeding said thread filaments in tensioned relation to said needles, a presser-foot mounted above said work support, means for moving said presser-foot to said work support in spaced-apart relation therefrom to permit said needles to feed said article with ease for each movement of the needles, means for measuring and cutting the thread filaments secured to said article to form hairs of uniform predetermined length on said article, a drive shaft carrying eccentrics, and means for actuating said needles and said presser-foot in timed relation from said eccentrics.

3. In combination with a machine having a plurality of hooked needles and means whereby the needles feed the material worked upon to form interlinked hairs on an article, a leg supported horizontal frame, a substantially upright elongated arm mounted on said frame adjacent said needles and having a work support at its upper end for supporting an article to be covered with hairs, said work support having open end slots through which said needles move up and down and forward and backward, means for supporting thread filament spools, a tubular housing carrying castoff elements and in which a needle bar is slidably mounted, means for feeding said thread filaments in tensioned relation to said needles, a presser-foot mounted above said work support, means for moving said presser-foot to said work support in spaced-apart relation therefrom to permit said needles to feed said article with ease for each movement of the needles, a drive shaft carrying one front, one intermediate and one rear eccentric and a trunnion in which said needle bar is movable up and down, a crank actuated by said drive shaft and connected to a needle actuating link for moving said needle bar up and down, a lever fixed to said trunnion and actuated by one of said eccentrics for moving said needle bar in a to and fro direction, and a presser-foot operated in timed relation from one of said eccentrics, and means for measuring and cutting the thread filaments secured to said article to form hairs of uniform predetermined length on said article.

4. In combination with a machine having a plurality of hooked needles and means whereby the needles feed the material worked upon to form interlinked hairs on an article, a leg supported horizontal frame, a substantially upright elongated arm mounted on said frame adjacent said needles and having a work support at its upper end for supporting an article to be covered with hairs, said work support having open end slots through which said needles move up and down and forward and backward, means for supporting thread filament spools, means for feeding said thread filaments in tensioned relation to said needles, a tubular housing carrying castoff elements and in which a needle bar is slidably mounted, a presser-foot mounted above said work support, means for moving said presser-foot to said work support in spaced-apart relation therefrom to permit said needles to feed said article with ease for each movement of the needles, a drive shaft carrying one front, one intermediate and one rear eccentric, a trunnion below said castoff carrier and in which said needle bar is movable up and down, a crank actuated by said drive shaft and connected to a needle actuating link for moving said needle bar up and down, a lever fixed to said trunnion and actuated by one of said eccentrics for moving said needle bar in a to and fro direction, a presser-foot operated in timed relation from one of said eccentrics, and means for measuring and cutting the thread filaments after securement to said article to form hairs of uniform predetermined length on said article.

5. In a machine having a plurality of hooked needles and means whereby the needles feed the material worked upon to form interlinked hairs on an article, a horizontal change gear-set supporting platform frame, a substantially upright arm mounted on said platform adjacent said needles and having a work suport at its upper end for supporting an article to be covered with hairs, said work support having slots through which said needles are movable, means for supporting thread filament spools mounted on said platform, means for feeding said thread filaments in tensioned relation to said needles, a tubular castoff carrier in which a needle bar is slidably mounted, a castoff bar, said carrier having a clamp at its lower end and being thereby secured to said castoff bar, a presser-foot mounted above said work support, means for moving said presser-foot to said work support in spaced-apart relation therefrom to permit said needles to feed said article with ease, a drive shaft carrying one front, one intermediate and one rear eccentric, a pivotally mounted trunnion below said castoff carrier and in which said needle bar and said castoff bar are movable up and down, a crank actuated by said drive shaft and connected to a needle bar actuating link for moving said needle bar up and down, an arm fixed to said trunnion and actuated by said front eccentric for moving said needle bar and said castoff bar in a to and fro direction, said castoff bar being actuated by said intermediate eccentric, said presser-foot being operated by said rear eccentric in timed relation with said needle bar, means for measuring and means for cutting the thread filaments after securement to said article to form hairs of uniform pre-determined length on said article.

6. In a machine having a plurality of hooked needles and means whereby the needles feed the material worked upon to form interlinked hairs on an article, a horizontal change-gear-set supporting platform, a substantially upright arm mounted on said platform adjacent said needles and having a work support at its upper end for supporting an article to be covered with hairs, said work support having slots through which said needles are movable, means for supporting thread filament spools and means for tensioning said thread filaments mounted on said platform, a tubular castoff carrier in which a needle bar is slidably mounted, a castoff bar, said carrier being secured to said castoff bar, a presser-foot mounted above said work support, means for moving said presser-foot to said work support in spaced-apart relation therefrom to permit said needles to feed said article with ease over said work support, a drive shaft carrying one front, one intermediate and one rear eccentric, a pivotally mounted trunnion below said castoff carrier and in which said needle bar and said castoff bar are movable, a crank actuated by said drive shaft and connected to a needle bar actuating link for moving said needle bar up and down, an arm fixed to said trunnion and actuated by said front eccentric for moving said needle bar and said castoff bar in a to and fro direction, said castoff bar being actuated by said intermediate eccentric, said presser-foot being operated by said rear eccentric in timed relation with said needle bar, and means for measuring and means for cutting the thread filaments after securement to said article to form hairs of uniform predetermined length in affixed relation on said article.

7. In a stitching machine of the class described including a plurality of hooked needles and means whereby the needles feed the material worked upon to form interlinked hairs on an article; means for supporting thread filament spools and means for tensioning said thread filaments, means for measuring pre-determined lengths of said thread filaments and means for cutting said thread filaments after securement to said article to form hairs of uniform length in affixed relation on said article, said measuring means comprising two rotatably mounted disks having elongated concentrically positioned openings disposed in spaced-apart relation at the outer periphery of said disks and open radially outwardly, each opening having a hook-shaped end for engaging the thread filament to be measured to length, and an arcuate guard fixed at the outer periphery of said disks to partly circumscribe said disks and prevent the fingers of the operator from entering said openings.

8. In a stitching machine of the class described including a plurality of hooked needles and means whereby the needles feed the material worked upon to form hairs on an article, means for supporting thread filament spools, means for measuring pre-determined lengths of said thread filaments, means for cutting said thread filaments to form hairs of uniform length on said article, said measuring means comprising two rotatably mounted disks; the improvement comprising the formation of elongated openings positioned concentrically and in spaced-apart relation at the outer periphery of said disks and open outwardly of said disks, each of said openings having a hook-shaped end facing in direction of rotation of said disks for engaging the thread filaments to be cut and measured to length.

9. In a stitching machine of the class described including a plurality of hooked needles and means whereby the needles feed the material worked upon to form hairs on an article, means for supporting thread filament spools, means for measuring pre-determined lengths of said thread filaments, means for cutting said thread filaments to form hairs of uniform length on said article, said measuring means comprising two rotatably mounted disks; the improvement comprising the formation of elongated openings positioned concentrically and in spaced-apart relation at the outer periphery of said disks and open outwardly of said disks, each of said openings having a hook-shaped end facing in direction of rotation of said disks for engaging the thread filaments to be cut and measured to length, and a guard fixed at the outer periphery of said disks to partly circumscribe said disks and prevent the fingers of the operator from entering said openings.

10. In a stitching machine of the class described including a plurality of hooked needles and means whereby the needles feed the material worked upon to form hairs on an article, means for supporting thread filament spools, means for measuring pre-determined lengths of said thread filaments, means for cutting said thread filaments to form hairs on said article, said measuring means comprising two rotatably mounted disks; the improvement comprising elongated openings positioned concentrically and in spaced-apart relation at the outer periphery of said disks and open outwardly of said disks, each of said openings defining a hook-shaped end facing in direction of rotation of said disks for engaging the thread filaments to be cut and measured to length, and a guard fixed adjacent the outer periphery of said disks and of a size to partly circumscribe said disks and prevent the fingers of the operator from entering said openings.

References Cited in the file of this patent

UNITED STATES PATENTS

| | | |
|---|---|---|
| 269,770 | Wood | Dec. 26, 1882 |
| 2,667,879 | Mann et al. | Feb. 2, 1954 |
| 2,686,305 | Hall | Aug. 10, 1954 |